Patented July 3, 1951

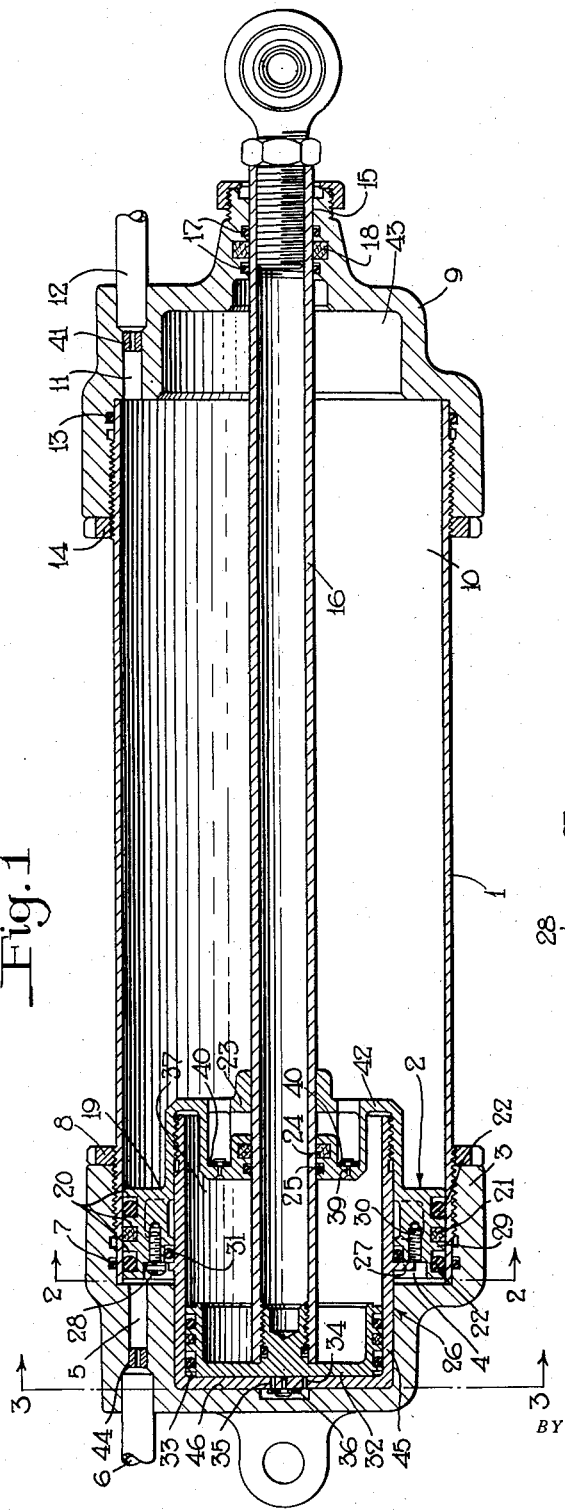

2,558,810

UNITED STATES PATENT OFFICE 2,558,810

FLUID PRESSURE MOTOR HAVING A CHECK FOR TERMINAL OPERATION THEREOF

Arthur J. Bent, Penn Township, Allegheny County, Pa., assignor to The Westinghouse Air Brake Company, Wilmerding, Pa., a corporation of Pennsylvania Application July 22, 1947, Serial No. 762,770

2 Claims. (Cl. 121—44)

This invention relates to compressible fluid pressure motors and more particularly to those of the reciprocating piston type.

An object of this invention is to provide a fluid pressure motor of the aforementioned type having novel means for cushioning or damping the action of the piston thereof as the piston nears the end of its stroke.

Another object of the invention is to provide a motor of the above mentioned type having a piston assemblage or arrangement whereby the force transmitted therefrom under the influence of any chosen fluid pressure will be reduced before the piston assemblage or arrangement completes its stroke.

A further object is to provide a fluid pressure motor of the piston type which will actuate a device such as a door to either its open position or its closed position very rapidly, the door being of such a type as to require a high actuating force during the first half of its movement and thereafter exerting a high force on said motor, which latter force must be checked before the door and piston reach the end of their traverse so as to prevent bouncing or slamming at the end of the traverse.

These and other objects will be made apparent in the following detailed description of the invention.

In the accompanying drawing, Fig. 1 is a diagrammatic view, mainly in section, of a fluid pressure motor embodying the invention; Fig. 2 is a sectional view of the device shown in Fig.1 taken on the line 2—2 shown in Fig. 1; and Fig. 3 is a sectional view of the device shown in Fig. 1 taken on the line 3—3 shown in Fig 1.

According to the invention as illustrated in Fig. 1, the fluid pressure motor comprises a cylinder casing 1 and a piston assemblage 2 operatively mounted in said cylinder casing for reciprocating movement therein.

Secured to one end of the cylinder casing 1, preferably by screw-thread means, is a cap member 3 which serves along with the piston assemblage 2 to define a chamber 4 to which compressible fluid under pressure may be supplied and from which compressible fluid under pressure may be exhausted by way of a passage 5, formed in the cap member 3 and a pipe 6. A sealing ring 7 is provided in a groove in the cap member 3 to effect an air-tight seal between the cap member and the cylinder casing 1. A locking ring 8 is provided for making a screw-thread connection with the cylinder casing 1 ahead of cap member 3 so that they may be jammed together in locking relation after the cap member is properly positioned.

Secured to the other end of the cylinder casing 1 in a similar manner is a cap member 9 which serves along with the piston assemblage 2 to define a chamber 10. Compressed fluid under pressure may be supplied to and released from chamber 10 by way of a supply and release passage 11, formed in the cap member 9, and a pipe 12. A sealing ring 13 and a locking ring 14 bear the same functional relation to cap member 9 as the previously mentioned sealing ring 7 and locking ring 8 do to cap member 3.

The cap member 9 is further provided with a centrally located opening 15 through which a piston stem 16 of the piston assemblage 2 may extend exteriorly to make a suitable connection with any device, such as a door, to be operated. A pair of sealing rings 17 and an oil-soaked swab 18 encircle the opening 15 and the stem 16 so as to effect a low friction, sliding connection between the cap member 9 and the stem 16 and also prevent leakage from the chamber 10 to the atmosphere.

The piston assemblage 2 comprises an annular piston member 19 which is arranged to be reciprocated from one end of the cylinder casing 1 to the other under the influence of fluid under pressure in a manner to be more fully described later. As previously noted, the chamber 4 lies at the left-hand side of the piston member 19 as viewed in Fig. 1 and the chamber 10 lies at the right-hand side of the piston member. The piston member 19 is encircled by three peripheral grooves 20 for the accommodation of a lubricating swab 21 in the middle groove and a packing ring 22 in each of the outer grooves, all of which slidingly engage the interior surface of the cylinder casing 1 so as to obtain low friction and also to prevent leakage of fluid under pressure past the piston member 19.

For aiding in slidably guiding the piston stem 16, a longitudinally extending support portion 23 is located centrally of and formed integrally with the piston member 19. This support portion 23 is likewise provided with a lubricating swab 24 and a packing ring 25 to reduce friction and prevent leakage of fluid under pressure between the support portion and the stem 16.

The piston assemblage 2 further comprises a cup-shaped cylinder member 26 which has, at its open end, a screw-threaded connection with the piston member 19. This cylinder member 26 is provided near the middle of its length with an outwardly extending annular flange 27 to abut the piston member 19 and act as a stop to limit the amount of rotation of both member 19 and member 26 relative to each other when making the above mentioned screw-threaded connection.

It will be noted upon reference to Fig. 2 that the piston member 19 and cylinder member 26 are locked against rotation relative to each other by means of a headed screw 28 which extends through a notch 29 in the flange 27 into one of a series of threaded holes 30 formed in the piston. It will further be noted in Fig. 2 that there are seven notches 29 equally spaced about a circle in the flange 27 while there are six threaded holes 30 equally spaced about the same circle in the piston member 19. It is thus possible to lock the piston member 19 and the cylinder member 27 in any one of forty-two different positions evenly spaced about a circle. In other words, there will be another locking position reached in approximately each 8.57 degrees of rotation in one complete revolution of 360 degrees.

A packing ring 31 is provided between the piston member 19 and the flange 27 of the cylinder member 26 to prevent leakage of fluid under pressure between chamber 4 and the interior of the cylinder member 26.

Slidably mounted in the cylinder member 26 and rigidly attached to the piston stem 16 for the transmission of power thereto is a piston 32 having at one side a chamber 33 which is open to chamber 4 by way of a restricted passage 34 in the left-hand end of the cylinder member 26 as viewed in Fig. 1. As will hereinafter appear more fully, upon movement of piston 32 in a direction toward the left hand relative to the cylinder member 26 additional ports 35 in the cylinder member will be uncovered by flapper valves 36 to establish a less restricted communication between chambers 4 and 33. (See Fig. 3.)

At the other side of the piston 32 is a chamber 37 which is open to chamber 10 by way of a restricted passage 38 formed in a portion of an end wall of the piston member 19. As will appear later, additional ports 39 will be uncovered by flapper valves 40 upon movement of the piston 32 toward the right relative to the cylinder member 26.

Operation

Let it be assumed that the piston assemblage 2 has moved under the influence of pressure of compressed fluid in chamber 10 to its extreme left-hand position, in which position it is shown in Fig. 1. Now when it is desired to move the piston assemblage 2 rapidly toward the right from the position in which it is shown, a control valve device (not shown) is operated to release compressed fluid from the chamber 10 by way of the supply and release passage 11 and pipe 12 and to supply compressed fluid under a pressure of 250 to 500 pounds, as conditions may require, to chamber 4 by way of the supply and release pipe 6 and passage 5. Compressed fluid under pressure supplied to chamber 4 acts on the left-hand face of the piston member 19 and the cylinder member 26 of the piston assemblage 2 to rapidly move the entire piston assemblage 2 in unison toward the right relative to the cylinder casing 1. The force thus established over the entire area of the piston assemblage 2 and the movement thus effected is transmitted through the medium of the piston 32 and piston rod 16 to any element or elements associated therewith to be put into action thereby.

It should here be understood that by reason of a choke 41 in the passage 11 the rapid movement of the piston assemblage 2 toward the right causes the compressible fluid in chamber 10 at the right of the assemblage 2 to develop a pressure which starts to be effective as a damping force when the piston assemblage has moved through approximately half of its stroke.

As the piston assemblage 2 nears the right-hand end of its stroke, a portion 42 of the piston member 26 which is of reduced diameter enters an accommodating recess 43 formed in the cap member 9, thereby trapping fluid between the piston member 19 and the cap member 9. It will be understood that the clearance between the portion 42 and the cap member 9 is such that the trapped fluid flows past the piston member 19 at a restricted rate only, so that the damping effect of a dashpot is obtained.

Continued movement of the piston member 19 toward the right under the continued influence of the pressure of fluid in chamber 4 brings the piston member into an inactive position in abutting engagement with the end wall of the cap member 9.

In practice it has been found, especially in opening bomb doors of an airplane, that the momentum of the doors will cause an outwardly directed pull to be exerted on the piston rod 16 and under these conditions, the piston 32, under the influence of the piston rod, moves to the right within the cylinder member 26. This movement of the piston 32 causes the fluid in chamber 37 at the right of the piston to be compressed and consequently the fluid under pressure in chamber 37 flows at a restricted rate by way of port 38 into recess 43. The pressure of fluid in chamber 37 also causes the flapper valves 40 to flex and permit fluid under pressure in chamber 37 to flow at a restricted rate into recess 43 by way of ports 39 and past the unseated valves 40. Fluid under pressure thus admitted to recess 43 flows past the reduced portion 42 of the piston member 19 into chamber 10 and thence to atmosphere by way of passage 11, choke 41, pipe 12 and a suitable control valve device (not shown).

As the piston 32 moves to the right relative to the cylinder member 26, fluid under pressure supplied to chamber 4 flows to chamber 33 by way of the restricted passage 34. It should be noted that at this time the ports 35 are closed by the flapper valves 36 so as to prevent fluid flow through these ports.

It should here be understood that flow of fluid under pressure by way of passage 34 only is not provided for the purpose of establishing a force acting on the piston 32 in the direction of the right hand but to compensate for the displacement of the piston 32 toward the right, at a slow rate, however, so as to permit the completion of the stroke of the piston rod 16 without bouncing or slamming.

Thus it will be seen that the cushioning of the piston member 19, and the piston assemblage 2, is begun by reason of the restrictive flow effect of choke 41 when the piston member is near the middle of its stroke, then additional contemporaneous cushioning is given to the piston member 19 by the dashpot action near the end of its stroke, and finally the piston member is eliminated entirely as a power controlling element. Further cushioning of the action of the piston rod 16 is accomplished by checking the action of the smaller piston 32 by means of the three flow restrictive means arranged in series, namely, flow restriction by ports 39 and passage 38, then by flow between wall of recess 43 and portion 42 of piston member 19, and finally by restriction at choke 41. Additional checking of the action of the piston rod 16 through the medium of the piston 32 is obtained by restricting the rate of supply of fluid for displacement of the piston 32 to the flow capacity of the small passage 34.

If, after the piston assemblage 2 has reached its extreme right-hand position, an operator should desire to reverse the direction of movement of the piston rod 16, he may operate the control valve device (not shown) to supply fluid under pressure by way of pipe 12, choke 41 and passage 11 and to release fluid under pressure from chamber 4 by way of passage 5, a choke 44 and pipe 6.

The choke 44 serves the same purpose during movement of the piston rod 16 toward the left as choke 41 does during movement of the piston rod toward the right. Thus, the rapid movement of the piston assemblage 2 toward the left causes the fluid in chamber 4 at the left of the assemblage 2 to develop a pressure which starts to be effective as a damping force when the piston assemblage has moved through approximately half of its stroke.

As the piston assemblage 2 nears the left-hand end of the casing 1 a portion 45 of the cylinder member 26, which is of reduced diameter, enters a recess 46 formed in the cap member 3. Here again the clearance between the reduced portion 45 of the cylinder member 26 and the inner peripheral wall of the recess 46 is such as to obtain a dashpot effect by temporarily trapping air in the recess, thereby further damping the movement of the push rod 16 toward the position in which it is shown in Fig. 1. The entire piston assemblage 2 continues to move toward the left hand as a unit at a reduced rate until the cylinder member 26 and the piston member 19 come into abutting engagement with the inside wall of the cap portion 3.

If a compression force should now be exerted on the piston rod 16, the piston 32, under the influence of the force transmitted by the rod, moves to the left within the cylinder member 26. This movement of the piston 32 causes the fluid in chamber 33 at the left of the piston 32 to be compressed. Fluid under pressure in chamber 33 flows at a restricted rate by way of port 34 into the recess 46. The pressure of fluid in chamber 33 and ports 35 causes the flapper valves 36 to flex and thereby permit compressed fluid in chamber 33 to flow to recess 46 by way of ports 35 also. Fluid under pressure thus admitted to recess 46 flows past the reduced portion 45 of the cylinder member 26 into chamber 4 and thence to atmosphere by way of passage 5, choke 44, pipe 6 and a suitable control valve device (not shown).

As the piston 32 moves to the left relative to the cylinder member 26, fluid under pressure supplied to chamber 10 flows to chamber 37 by way of the restricted passage 38, the ports 39 being closed at this time by the flapper valves 40. The piston rod 16 under the influence of the door, or other device to be operated, will continue to move to the left until arrested by the engagement of the piston 32 with the end wall of the cylinder member 26.

It will now be seen that the operation previously described in connection with outward movement of the piston rod is duplicated upon inward movement of the piston rod with the same sequence of damping operations and consequently obtains the same smoothness of operation without slamming or bouncing.

Having now described my invention, what I claim as new and desire to secure by Letters Patent, is:

1. In a compressible fluid pressure motor, a cylinder having an end wall with a recess therein open to the interior of the cylinder, a piston member slidably mounted in said cylinder and comprising a cylindrical portion adapted to effect a dashpot action in said recess whereby compressible fluid under pressure in said recess flows at a restricted rate to said cylinder, a supply communication through which compressed fluid is admitted to said cylinder to act on one side of said piston member, an exhaust communication in said cylinder exteriorly of said recess through which compressible fluid at the other side of said piston member is vented from the cylinder at a relatively fast rate, a piston slidably mounted in said cylindrical portion and movable relative to said piston member after the piston member has completed the dashpot action at the end of its stroke, one communication in said cylindrical portion through which fluid displaced by the movement of said piston may flow from the piston member to said recess, another communication in said cylindrical portion of smaller flow area than that of said one communication through which compressed fluid at said one side of the piston member flows into said piston member at the other side of the piston to compensate for the displacement of the piston, and a piston rod operatively connected to said piston whereby force is transmitted to said rod during the first portion of the travel of said rod and then its movement is resisted for the remainder of the travel.

2. In a compressible fluid pressure motor, a cylinder having an end wall with a recess therein open to the interior of the cylinder, a piston member slidably mounted in said cylinder, said piston member comprising a cylindrical portion adapted to effect a dashpot action in said recess whereby compressible fluid under pressure in said recess flows at a restricted rate to said cylinder, a supply communication through which compressed fluid is admitted to said cylinder to act on one said of said piston member, an exhaust communication in said cylinder exteriorly of said recess through which compressible fluid at the other side of said piston member is vented from the cylinder at a relatively fast rate, a piston slidably mounted in said cylindrical portion and movable relative to said piston member after the piston member has completed the dashpot action at the end of its stroke, a communication in said cylindrical portion by which fluid displaced by said piston may flow at a relatively slow rate from one side of said piston to said recess, another communication in said cylindrical portion of smaller flow area than that of said one communication by which compressed fluid at said one side of the piston member flows to the other side of said piston to compensate for the displacement of the piston, and a piston rod operatively connected to said piston whereby force is transmitted to said rod during the first portion of the traverse of said rod and thereafter its movement is damped.

ARTHUR J. BENT.

REFERENCES CITED

The following references are of record in the file of this patent:

UNITED STATES PATENTS

| Number | Name | Date |
|---|---|---|
| 834,825 | Logan | Oct. 30, 1906 |
| 840,877 | Steedman | Jan. 8, 1907 |
| 850,583 | Howard | Apr. 16, 1907 |
| 2,193,125 | Evans | Mar. 12, 1940 |
| 2,259,576 | MacMillin | Oct. 21, 1941 |
| 2,387,777 | Stanton | Oct. 30, 1945 |

FOREIGN PATENTS

| Number | Country | Date |
|---|---|---|
| 794,815 | France | Dec. 26, 1935 |